(12) United States Patent
Shaffer et al.

(10) Patent No.: US 9,638,439 B2
(45) Date of Patent: May 2, 2017

(54) WATER HEATER APPLIANCE

(71) Applicant: General Electric Company, Schenectady, NY (US)

(72) Inventors: Timothy Scott Shaffer, La Grange, KY (US); Shaun Michael Ward, Louisville, KY (US); Dan Riley, The Villages, FL (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 72 days.

(21) Appl. No.: 14/596,276

(22) Filed: Jan. 14, 2015

(65) Prior Publication Data
US 2016/0201946 A1 Jul. 14, 2016

(51) Int. Cl.
| F24H 9/12 | (2006.01) |
| F24H 9/14 | (2006.01) |
| F24H 9/20 | (2006.01) |
| G05D 23/185 | (2006.01) |

(52) U.S. Cl.
CPC ........... *F24H 9/124* (2013.01); *F24H 9/142* (2013.01); *F24H 9/2007* (2013.01); *G05D 23/1858* (2013.01)

(58) Field of Classification Search
CPC ........ F24H 9/124; F24H 9/2007; F24H 9/142; G05D 23/1858; F16K 31/002
See application file for complete search history.

(56) References Cited

U.S. PATENT DOCUMENTS

| 2,807,421 A * | 9/1957 | Carlson, Jr. ............... F16T 1/10 126/343.5 A |
| 3,071,341 A * | 1/1963 | Wantz ..................... F23N 5/067 236/99 R |
| 3,191,863 A * | 6/1965 | King et al. ........... G05D 23/127 236/99 R |
| 4,585,208 A * | 4/1986 | Andresen ................. F16K 1/52 137/637.2 |
| 5,159,658 A * | 10/1992 | Tuttle .................... F24H 9/2021 122/14.22 |
| 5,205,483 A * | 4/1993 | Kostorz ............. G05D 23/1346 236/12.2 |
| 5,230,465 A * | 7/1993 | Kostorz ............. G05D 23/1346 236/12.1 |
| 6,929,188 B2 * | 8/2005 | Taylor ................ G05D 23/1313 236/12.12 |
| 2005/0047612 A1 * | 3/2005 | Shimada ................ G05G 1/087 381/104 |
| 2009/0078218 A1 * | 3/2009 | Gordon ............... F24D 19/1051 122/13.3 |

(Continued)

FOREIGN PATENT DOCUMENTS

CN 1731056 * 8/2005
CN 201818834 U 5/2011

*Primary Examiner* — Steven B McAllister
*Assistant Examiner* — Steven Anderson, II
(74) *Attorney, Agent, or Firm* — Dority & Manning, P.A.

(57) ABSTRACT

A water heater appliance with a mixing valve positioned within a casing of the water heater appliance is provided. The mixing valve is fluidly coupled to a heated water conduit and a bypass conduit of the water heater appliance. An actuator assembly is configured for selectively adjusting a mixing ratio of the mixing valve. The actuator assembly includes a knob positioned at an outer surface of the casing.

10 Claims, 6 Drawing Sheets

(56) References Cited

U.S. PATENT DOCUMENTS

2010/0123014 A1* 5/2010 Beagen .............. G05D 23/1346
236/12.2
2012/0024968 A1* 2/2012 Beyerle .............. G05D 23/1346
236/12.11

* cited by examiner

WATER HEATER APPLIANCE

FIELD OF THE INVENTION

The present subject matter relates generally to water heater appliances with integrated mixing valves.

BACKGROUND OF THE INVENTION

Certain water heater appliances include a tank therein. Heating elements, such as gas burners, electric resistance elements, or induction elements, heat water within the tank during operation of such water heater appliances. In particular, the heating elements generally heat water within the tank to a predetermined temperature. The predetermined temperature is generally selected such that heated water within the tank is suitable for showering, washing hands, etc.

During operation, relatively cool water flows into the tank, and the heating elements operate to heat such water to the predetermined temperature. Thus, the volume of heated water available at the predetermined temperature is generally limited to the volume of the tank. According, water heater appliances are sold in various sizes to permit consumers to select a proper tank volume and provide sufficient heated water. However, large water heater appliances with large tanks occupy large amount of space within a residence or business. In certain buildings, space is limited and/or expensive. Thus, utilizing large water heater appliances can be impractical and/or prohibitively expensive despite needing large volumes of heated water.

To provide relatively large volumes of heated water from relatively small tanks, certain water heater appliances utilize a mixing valve. The mixing valve permits water within the water heater's tank to be stored at relatively high temperatures. The mixing valve mixes such high temperature water with relatively cool water in order to bring the temperature of such water down to suitable and/or more usable temperatures. Thus, such water heater appliance can provide relatively large volumes of heated water without requiring large tanks. However, accessing the mixing valve in order to adjust the ratio of high temperature water and relatively cool water can be difficult or inconvenient when the mixing valve is integrated within the water heater appliance.

Accordingly, a water heater appliance having a mixing valve that includes features for facilitating adjustment of the mixing valve would be useful.

BRIEF DESCRIPTION OF THE INVENTION

The present subject matter provides a water heater appliance. The water heater appliance includes a mixing valve positioned within a casing. The mixing valve is fluidly coupled to a heated water conduit and a bypass conduit of the water heater appliance. An actuator assembly is configured for selectively adjusting a mixing ratio of the mixing valve. The actuator assembly includes a knob positioned at an outer surface of the casing. Additional aspects and advantages of the invention will be set forth in part in the following description, or may be apparent from the description, or may be learned through practice of the invention.

In a first exemplary embodiment, a water heater appliance is provided. The water heater appliance includes a casing. A tank is disposed within the casing. The tank defines an interior volume. A cold water conduit is mounted to the tank and is configured for directing water into the interior volume of the tank. A heated water conduit is also mounted to the tank and is configured for directing water out of the interior volume of the tank. A bypass conduit extends from the cold water conduit. A mixing valve is positioned within the casing. The mixing valve is fluidly coupled to the heated water conduit and the bypass conduit. The mixing valve is configured for selectively directing liquid from the bypass conduit into the heated water conduit. An actuator assembly is configured for selectively adjusting a mixing ratio of the mixing valve. The actuator assembly includes a knob positioned at an outer surface of the casing. The knob is rotatable about an axis of rotation. The knob is also movable along the axis of rotation between a first position and a second position. A linkage couples the knob and the mixing valve together when the knob is in the second position on the axis of rotation. A biasing mechanism is configured for urging the knob towards the first position.

In a second exemplary embodiment, a water heater appliance is provided. The water heater appliance includes a casing. A tank is disposed within the casing. The tank defines an interior volume. A cold water conduit is mounted to the tank and is configured for directing water into the interior volume of the tank. A heated water conduit is also mounted to the tank and is configured for directing water out of the interior volume of the tank. A bypass conduit is coupled to the cold water conduit. A mixing valve is positioned within the casing. The mixing valve is fluidly coupled to the heated water conduit and the bypass conduit. The mixing valve is configured for selectively directing liquid from the bypass conduit into the heated water conduit. An actuator assembly is configured for selectively adjusting a mixing ratio of the mixing valve. The actuator assembly defines an axial direction and includes a knob positioned at an outer surface of the casing. A linkage extends along the axial direction from the knob towards the mixing valve. A biasing mechanism is coupled to the linkage and urges the linkage away from the mixing valve along the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
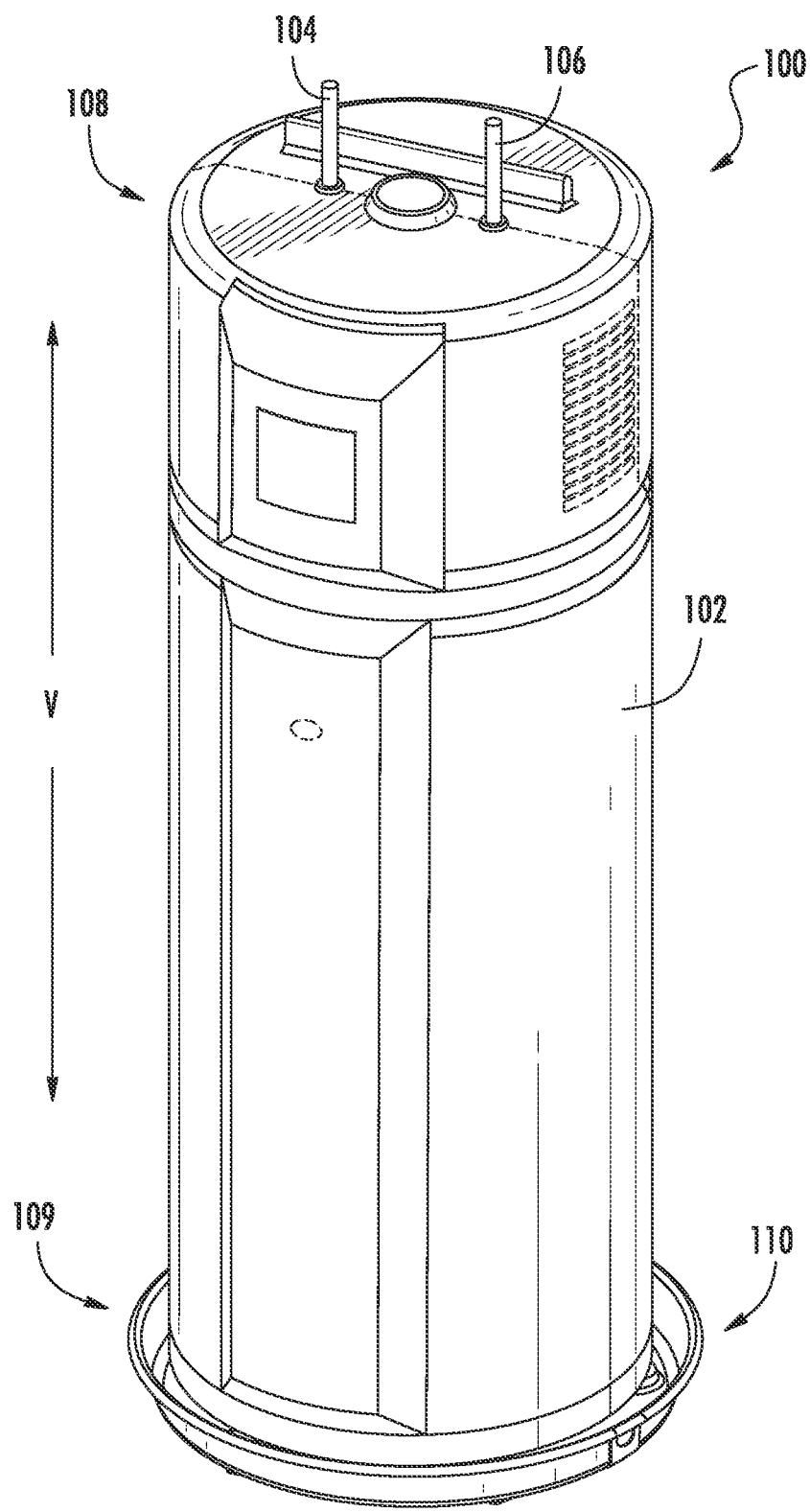
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes an outer shell or casing 102. Casing 102 generally surrounds a tank 112 (FIG. 2) such that tank 112 is disposed within casing 102. Upper and lower heating elements 118, 119 (FIG. 2) and a sealed system 120 (FIG. 2) may also be positioned within casing 102 for heating water within tank 112. Upper and lower heating elements 118, 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes an inlet or cold water conduit 104 and an outlet or hot water conduit 106 that are both in fluid communication with a chamber or interior volume 114 (FIG. 2) defined by tank 112. As an example, cold water from a water source, e.g., a municipal water supply or a well, can enter water heater appliance 100 through cold water conduit 104. From cold water conduit 104, such cold water can enter interior volume 114 of tank 112 wherein it is heated with heating elements 118, 119 and/or sealed system 120 to generate heated water. Such heated water can exit water heater appliance 100 at hot water conduit 106 and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 (FIG. 2) of water heater appliance 100. It should be understood that water heater appliance 100 is provided by way of example only and that the present subject matter may be used with any suitable water heater appliance.

Figure 2:
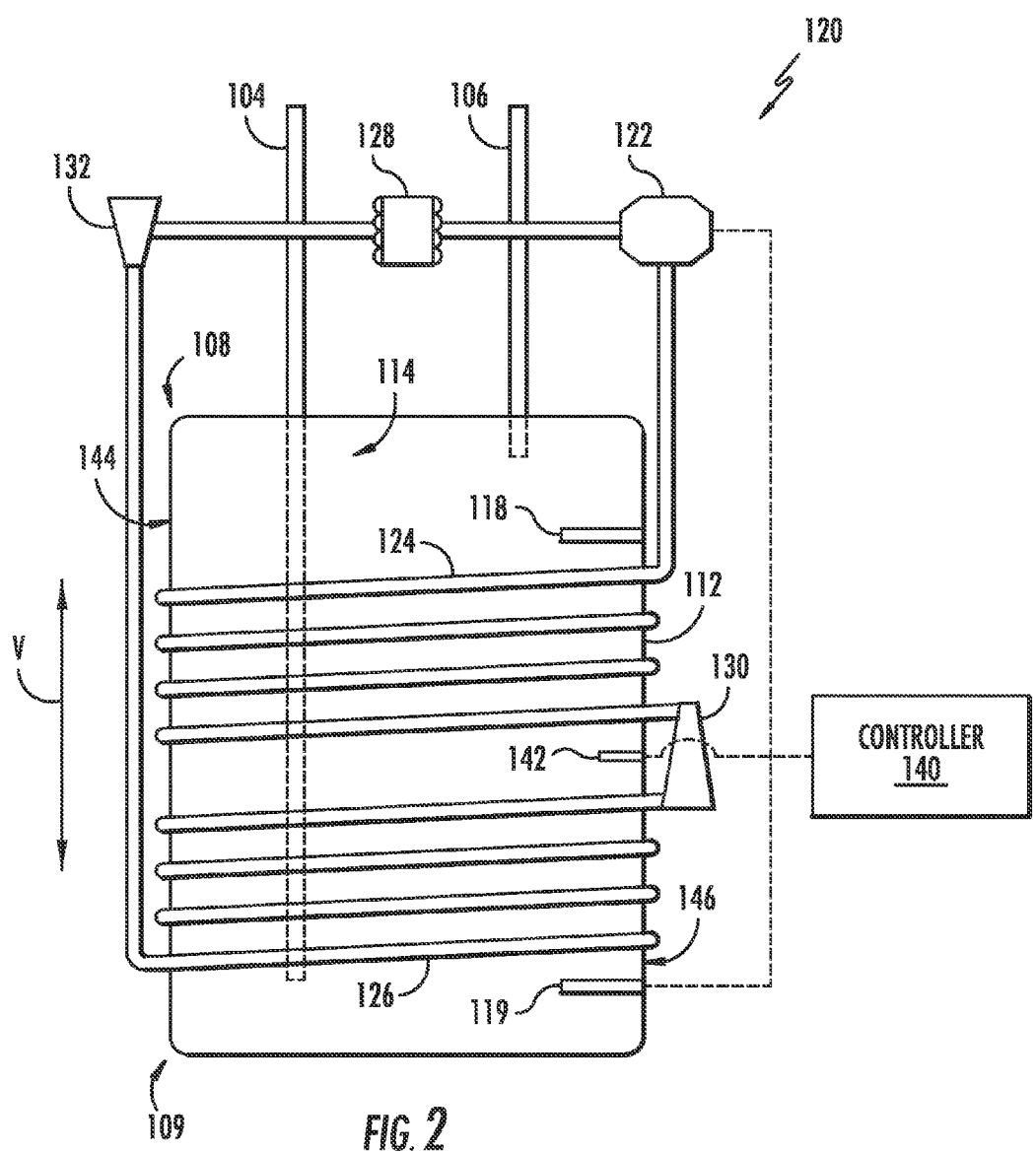
FIG. 2 provides a schematic view of certain components of the exemplary water heater appliance of FIG. 1.

FIG. 2 provides a schematic view of certain components of water heater appliance 100. As may be seen in FIG. 2, water heater appliance 100 may include sealed system 120 for heating water within interior volume 114 of tank 112. Sealed system 120 generally operates in a heat pump cycle. Thus, water heater appliance 100 is commonly referred to as a "heat pump water heater appliance." Water heater appliance 100 may additionally include one or more auxiliary heating elements, such as upper heating element 118 and/or lower heating element 119.

Sealed system 120 may include a compressor 122, a first condenser 124, a second condenser 126 and an evaporator 128. Compressor 122 and/or evaporator 128 of sealed system 120 may be disposed within casing 102 at top portion 108 of water heater appliance 100. As is generally understood, various conduits may be utilized to flow refrigerant between the various components of sealed system 120. Thus, e.g., evaporator 128 may be between and in fluid communication with second condenser 126 and compressor 122. During operation of sealed system 120, refrigerant may flow from evaporator 128 through compressor 122. For example, refrigerant may exit evaporator 128 as a fluid in the form of a superheated vapor and/or high quality vapor mixture. Upon exiting evaporator 128, the refrigerant may enter compressor 122. Compressor 122 may be operable to compress the refrigerant. Accordingly, the pressure and temperature of the refrigerant may be increased in compressor 122 such that the refrigerant becomes a superheated vapor.

Each condenser 124, 126 may be assembled in a heat exchange relationship with tank 112 in order to heat water within interior volume 114 of tank 112 during operation of sealed system 120. First condenser 124 may be positioned downstream of and in fluid communication with compressor 122, and may be operable to heat the water within interior volume 114 using energy from the refrigerant. For example, the superheated vapor from compressor 122 may enter first condenser 124 wherein it transfers energy to the water within tank 112 and condenses into a saturated liquid and/or liquid vapor mixture. Second condenser 126 may be positioned downstream of and in fluid communication with first condenser 124, and may additionally be operable to heat the water within interior volume 114 using energy from the refrigerant, such as by further condensing the refrigerant.

Sealed system 120 may also include a first throttling device 130 between first condenser 124 and second condenser 126, and/or a second throttling device 132 between second condenser 126 and evaporator 128. Refrigerant, which may be in the form saturated liquid vapor mixture, may exit first condenser 124 and travel through first throttling device 130 before flowing through second condenser 126. First throttling device 130 may generally expand the refrigerant, lowering the pressure and temperature thereof. The refrigerant may then be flowed through second condenser 126. Similarly, refrigerant, which may be in the form of high quality/saturated liquid vapor mixture, may exit second condenser 126 and travel through second throttling device 132 before flowing through evaporator 128. Second throttling device 132 may generally expand the refrigerant, lowering the pressure and temperature thereof. The refrigerant may then be flowed through evaporator 128.

First and second throttling devices 130, 132 may be any suitable components for generally expanding the refrigerant. For example, in some exemplary embodiments, first and second throttling device 130, 132 may be a Joule-Thomson expansion valve, also known as a "J-T valve." In other exemplary embodiments, first and second throttling device 130, 132 may be an ejector. In still other exemplary embodiments, a capillary tube, fixed orifice, or other suitable apparatus may be utilized as first and second throttling device 130, 132.

Water heater appliance 100 may additionally include a temperature sensor 142. Temperature sensor 142 may be configured for measuring a temperature of water within interior volume 114 of tank 112. Temperature sensor 142 can be positioned at any suitable location within water heater appliance 100. For example, temperature sensor 142 may be positioned within interior volume 114 of tank 112 or may be mounted to tank 112 outside of interior volume 114 of tank 112. Temperature sensor 142 may further be positioned at upper portion 142 or lower portion 144 of tank 112. When mounted to tank 112 outside of interior volume 114 of tank 112, temperature sensor 142 can be configured for indirectly measuring the temperature of water within interior volume 114 of tank 112. For example, temperature sensor 142 can measure the temperature of tank 112 and correlate the temperature of tank 112 to the temperature of water within interior volume 114 of tank 112. Temperature sensor 142 may be any suitable temperature sensor. For example, temperature sensor 142 may be a thermocouple or a thermistor.

Water heater appliance 100 may further include a controller 140 that regulates operation of water heater appliance 100. Controller 140 may be, for example, in operative communication with sealed system 120 (such as compressor 122, and/or other components thereof), auxiliary heating elements, and/or temperature sensor 142. Thus, controller 140 can selectively activate system 120 and/or auxiliary heating elements in order to heat water within interior volume 114 of tank 112.

Controller 140 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 3:
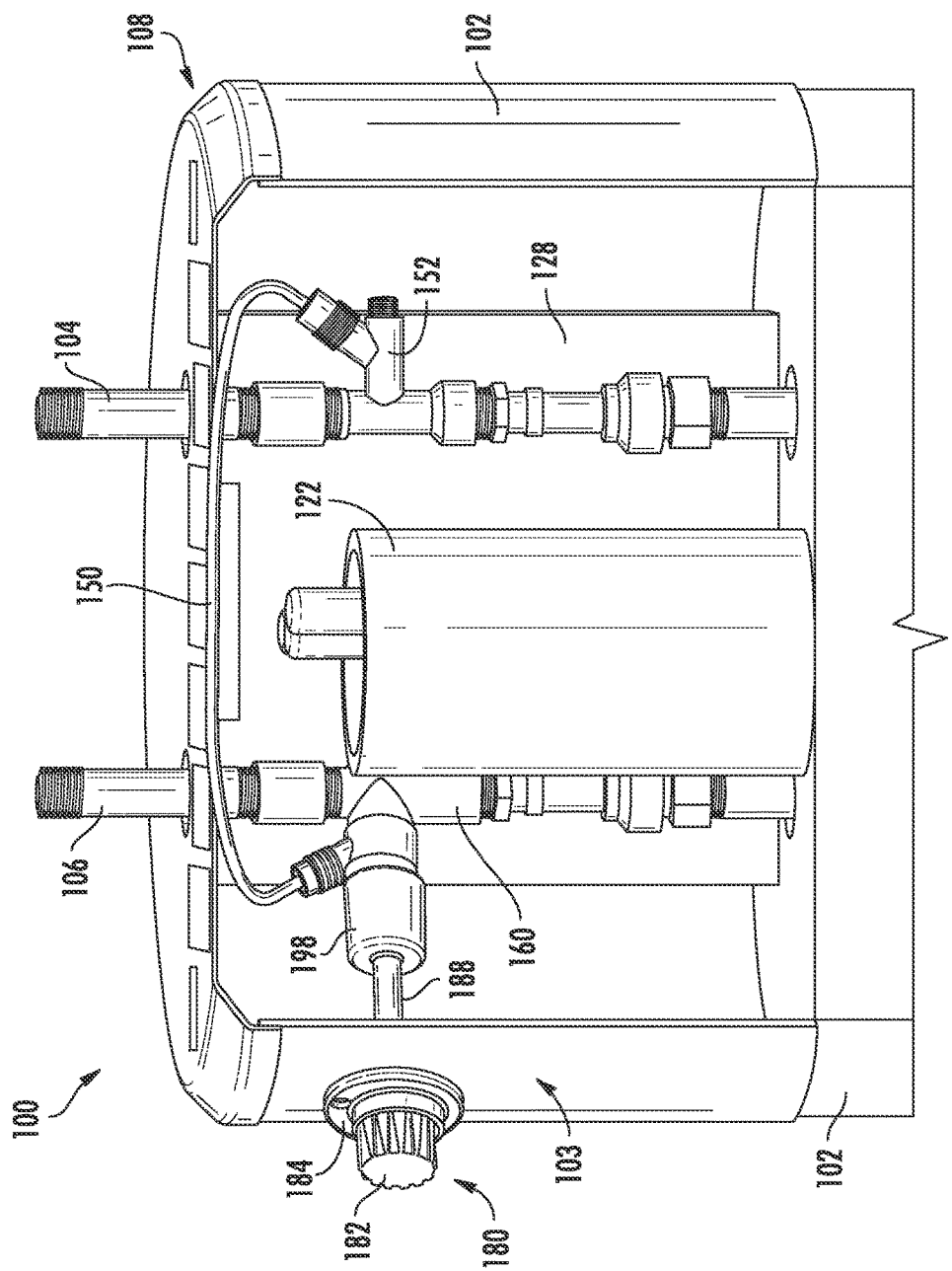
FIG. 3 provides a partial section view of the exemplary water heater appliance of FIG. 1.

FIG. 3 provides a partial section view of water heater appliance 100. As may be seen in FIG. 3, cold water conduit 104 and hot water conduit 106 are mounted to tank 112 at or adjacent top portion 108 of water heater appliance 100. As discussed above, evaporator 128 and compressor 122 are positioned within casing 102 at or adjacent top portion 108 of water heater appliance 100 above tank 112. Water heater appliance 100 also includes features for directing water from cold water conduit 104 into hot water conduit 106, e.g., in order to regulate the temperature of water supplied to points downstream of water heater appliance 100. Such features are discussed in greater detail below.

As may be seen in FIG. 3, water heater appliance 100 includes a bypass conduit 150, a mixing valve 160 and an actuator assembly 180. Bypass conduit 150 is coupled to cold water conduit 104 and extends from cold water conduit 104 to mixing valve 160. In particular, bypass conduit 150 may be mounted (e.g., threaded or glued) to a bypass coupling 152, such as a T-joint or Y-joint, on cold water conduit 104. Bypass conduit 150 may also be mounted (e.g., threaded or glued) to mixing valve 160 on cold water conduit 104. Bypass conduit 150 may be any suitable type of conduit, such as a pipe or hose. As an example, bypass conduit 150 may be a hose positioned within casing 102 at top portion 108 of water heater appliance 100.

Mixing valve 160 is positioned within casing 102, e.g., at or adjacent top portion 108 of water heater appliance 100. Thus, mixing valve 160 is integrated within water heater appliance 100. Mixing valve 160 is fluidly coupled to hot water conduit 106 and bypass conduit 150. As discussed in greater detail below, mixing valve 160 is configured for selectively directing liquid from bypass conduit 150 into hot water conduit 106. Mixing valve 160 may be any suitable valve for mixing two fluid steams, i.e., for mixing liquid from hot water conduit 106 with liquid from bypass conduit 150. For example, mixing valve 160 may be a thermostatic mixing valve such that mixing valve 160 automatically adjusts a mixing ratio of mixing valve 160. As used herein, the phrase "mixing ratio" corresponds to a ratio of liquid from hot water conduit 106 to liquid from bypass conduit 150 that is directed from mixing valve 160 at an mixed water outlet 168 (FIG. 4) of mixing valve 160. The temperature of liquid in hot water conduit 106 may be greater than that of liquid in bypass conduit 150. Thus, a temperature of liquid exiting mixing valve 160 may be adjusted or changed by adjusting the mixing ratio of mixing valve 160, as will be understood by those skilled in the art. Actuator assembly 180 is configured for selectively adjusting the mixing ratio of mixing valve 160. Thus, as discussed in greater detail below, a user of water heater appliance 100 may utilize actuator assembly 180 to adjust the mixing ratio of mixing valve 160 and change the temperature of water supplied downstream of mixing valve 160.

Figure 4:
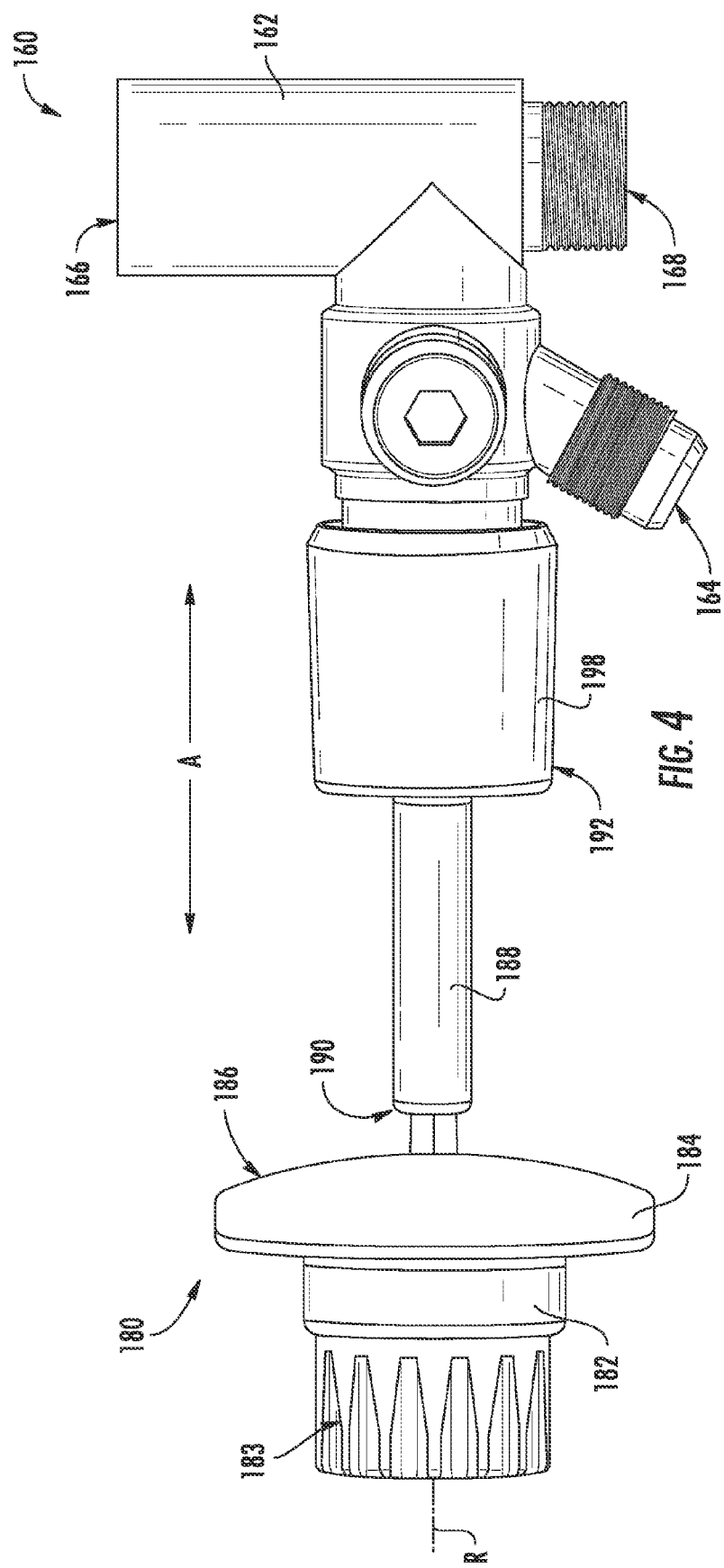
FIG. 4 provides a side, elevation view of a mixing valve and actuator assembly of the exemplary water heater appliance of FIG. 1.
Figure 5:
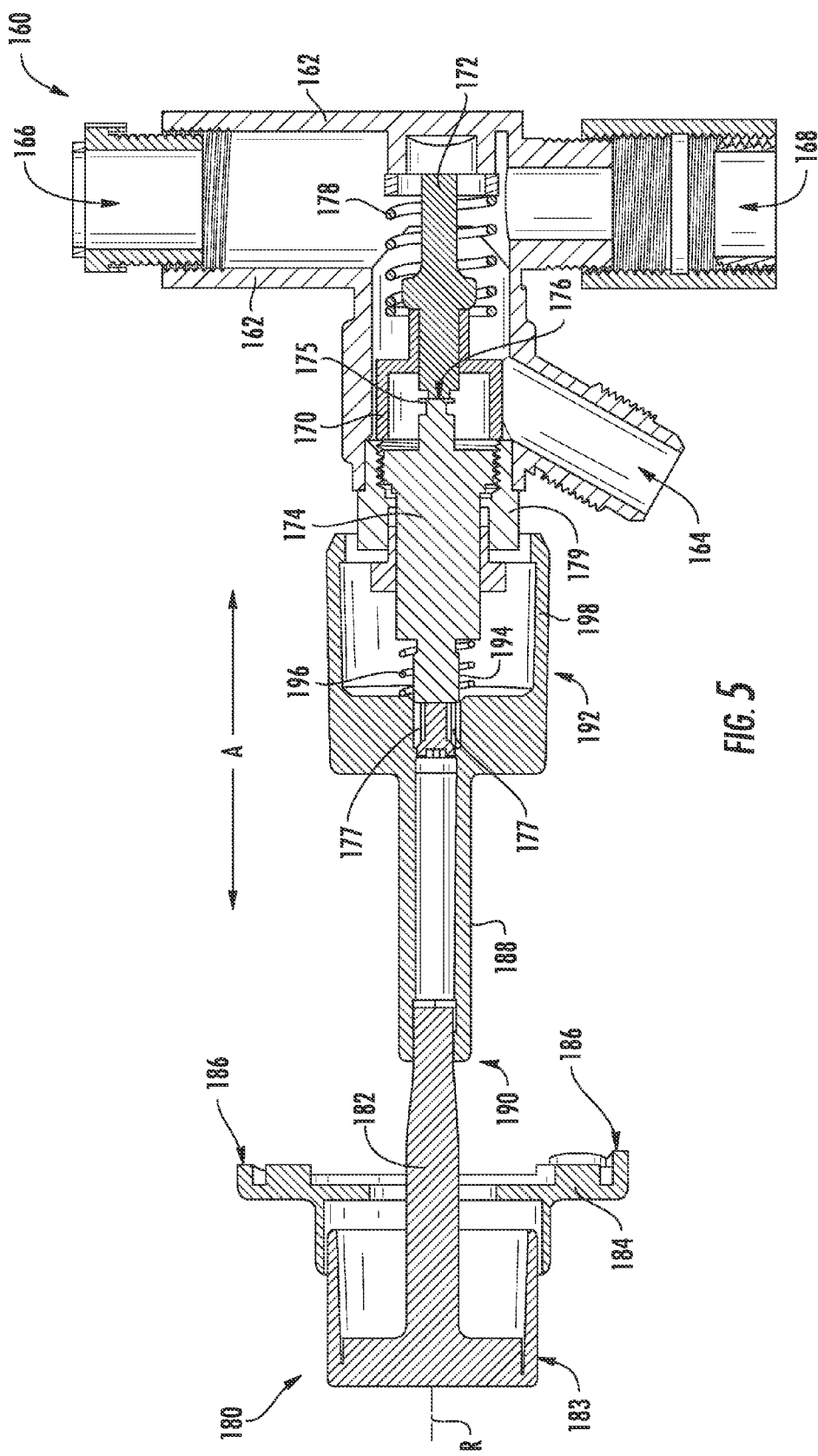
FIG. 5 provides a side, section view of the mixing valve and actuator assembly of FIG. 4.
Figure 6:
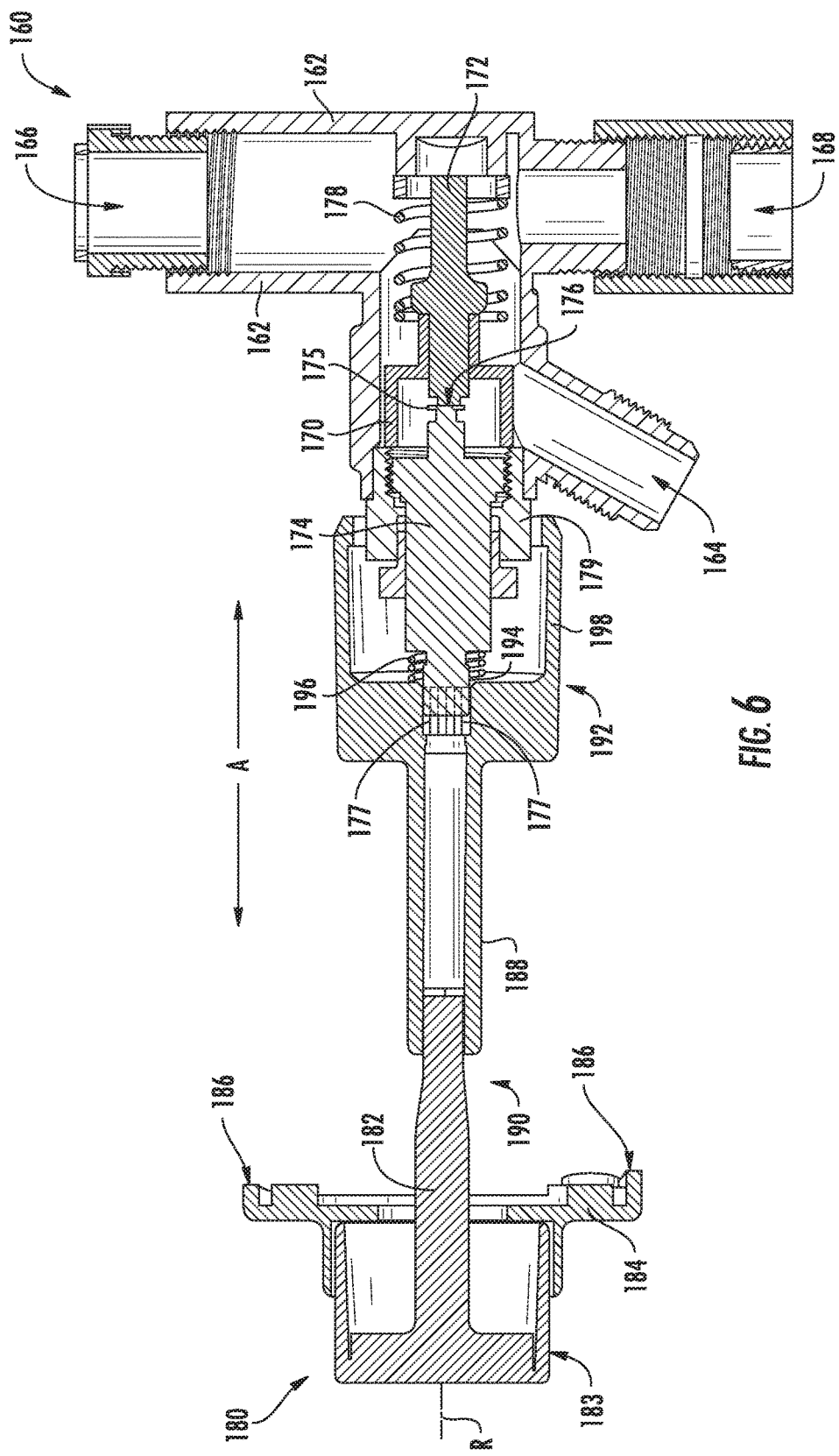
FIG. 6 provides another side, section view of the mixing valve and actuator assembly of FIG. 4.

FIG. 4 provides a side, elevation view of mixing valve 160 and actuator assembly 180 of water heater appliance 100. FIG. 5 provides a side, section view of mixing valve 160 and actuator assembly 180. FIG. 6 provides another side, section view of mixing valve 160 and actuator assembly 180. As may be seen in FIGS. 4 and 5, actuator assembly 180 defines an axial direction A.

Actuator assembly 180 includes a knob 182 and an axle or linkage 188 that selectively couples knob 182 to mixing valve 160. Knob 182 is positioned at or on an outer surface 103 of casing 102. Thus, knob 182 may be positioned at an exterior of water heater appliance 100 and be accessible to a user of water heater appliance 100, e.g., without requiring removal of casing 102 or other components of water heater appliance 100. Thus, knob 182 may be easily accessible to the user of water heater appliance 100. Knob 182 is rotatable about an axis of rotation R, e.g., that is parallel to the axial direction A. A textured surface 183 of knob 182 may assist the user of water heater appliance 100 with grasping and rotating knob 182 on the axis of rotation R. Textured surface 183 may include ridges, dimples, etc. to improve a grip of the user on knob 182. Knob 182 is also movable along the axial direction A between a first position (shown in FIGS. 4 and 5) and a second position (FIG. 6). As an example, from the first position, the user of water heater appliance 100 may push knob 182 towards mixing valve 160 in order to move knob 182 from the first position to the second position. Thus, knob 182 may be positioned closer to mixing valve 160 in the second position relative to the first position.

Actuator assembly 180 also includes a shroud interface 184. Shroud interface 184 is mounted to or positioned on casing 102 at outer surface 103 of casing 102. Knob 182 is at least partially disposed within shroud interface 184. For example, a diameter of knob 182 may be sized less than a diameter shroud interface 184 such that an outer edge of knob 182 is received within shroud interface 184 as shown in FIG. 5. Shroud interface 184 defines an inner surface 186 that faces and is positioned on outer surface 103 of casing 102. Inner surface 186 of shroud interface 184 is shaped to complement outer surface 103 of casing 102, e.g., such that shroud interface 184 sits flush on outer surface 103 of casing 102.

As discussed above, linkage 188 selectively couples knob 182 and mixing valve 160 together. In particular, linkage 188 couples knob 182 and mixing valve 160 together, e.g., such that rotation of knob 182 is transferred to mixing valve 160 via linkage 188, when knob 182 is in the second position. Thus, the user of water heater appliance 100 may push knob 182 from the first position (FIG. 4) to the second position and rotate knob 182 about the axis of rotation R in order to adjust the mixing ratio of mixing valve 160. Linkage 188 extends between a first end portion 190 and a second end portion 192, e.g., along the axial direction A. Linkage 188 may be fixed to knob 182 at first end portion 190 of linkage 188, and may be selectively coupled to mixing valve 160 at second end portion 192 of linkage 188, as discussed in greater detail below. Thus, linkage 188 may extend along the axial direction A from knob 182 towards mixing valve 160.

Turning now to FIG. 5, actuator assembly 180 also includes a biasing mechanism 196. Biasing mechanism 196 is configured for urging knob 182 away from the second position and/or towards the first position as shown in FIG. 5. Thus, biasing mechanism 196 may be coupled to linkage 188 and urge linkage 188 away from mixing valve 160, e.g., along the axial direction A. Biasing mechanism 196 may be any suitable biasing mechanism. For example, biasing mechanism 196 may be a coil spring, a machined spring, a gas spring, etc. As shown in FIG. 5, biasing mechanism 196 may be a spring positioned within a shroud 198 of linkage 188 at second end portion 192 of linkage 188 and compressed between a stem 174 of mixing valve 160 and linkage 188.

As may be seen in FIG. 5, mixing valve 160 includes a valve body 162. Valve body 162 defines a cold water inlet 164, a heated water inlet 166 and a mixed water outlet 168. Cold water inlet 164 of valve body 162 is coupled (e.g., threaded) to bypass conduit 150, e.g., such that valve body 162 is fluidly coupled to bypass conduit 150 and water from bypass conduit 150 may flow into valve body 162 via cold water inlet 164 of valve body 162. Hot water inlet 166 of valve body 162 is coupled (e.g., threaded) to hot water conduit 106, e.g., such that valve body 162 is fluidly coupled to hot water conduit 106 and water from hot water conduit 106 may flow into valve body 162 via hot water inlet 166 of valve body 162. Water from bypass conduit 150 may mix with water from hot water conduit 106 within valve body 162, e.g., in order to lower the temperature of water from hot water conduit 106. Water within valve body 162 may exit valve body 162 at mixed water outlet 168. Thus, liquid exiting valve body 162 at mixed water outlet 168 may have a temperature less than a temperature of liquid in hot water conduit 106.

Mixing valve 160 also includes a bung or plug 170 and a wax thermostat 172. Plug 170 and wax thermostat 172 are positioned within valve body 162. Wax thermostat 172 is coupled to plug 170 within valve body 162, and wax thermostat 172 is configured for moving plug 170 within valve body 162 in order to adjust the mixing ratio of mixing valve 160. For example, when wax thermostat 172 is heated, a probe of wax thermostat 172 may extend in order to move plug 170 away from cold water inlet 164 of valve body 162 and thereby allow more water from bypass conduit 150 into valve body 162. Conversely, when wax thermostat 172 cools, the probe of wax thermostat 172 may retract in order to move plug 170 closer to cold water inlet 164 of valve body 162 and thereby decrease the flow of water from bypass conduit 150 into valve body 162.

As may be seen in FIG. 5, mixing valve 160 also includes a stem 174. Stem 174 is threaded to valve body 162, e.g., at or adjacent second end portion 192 of linkage 188. Stem 174 extends through valve body 162, e.g., from wax thermostat 172 to linkage 188 through a bonnet 179 of mixing valve 160. Stem 174 and linkage 188 are coupled together, e.g., such that linkage 188 and stem 174 rotate together on the axis of rotation R, when knob 182 is in the second position. Thus, the position of stem 174 may be adjusted by rotating stem 174 relative to valve body 162 with knob 182 when knob 182 is in the second position. To assist with coupling stem 174 and linkage 188 together, linkage 188 defines a plurality of splines 177 and stem 174 also defines a plurality of splines 194. As may be seen in FIG. 5, splines 177 of linkage 188 do not mesh with splines 194 of stem 174 when knob 182 is in the first position. Conversely, when knob 182 is towards mixing valve 160 and moved to the second position, splines 177 of linkage 188 mesh with or engage splines 194 of stem 174. When splines 177 of linkage 188 mesh with or engage splines 194 of stem 174, stem 174 and linkage 188 are coupled together, e.g., such that linkage 188 and stem 174 rotate together on the axis of rotation R. Thus, when a user rotates knob 182, stem 174 rotates relative to valve body 162 and a position of a seat 175 of stem 174 within valve body 162 changes.

As may be seen in FIG. 5, seat 175 of stem 174 is positioned at a distal end 176 of stem 174, e.g., immediately adjacent or in contact with wax thermostat 172. The probe of wax thermostat 172 may engage seat 175 of stem 174 in order to adjust the position of plug 170 within valve body 162. Thus, changing the position of seat 175 within valve body 162 may adjust the motion of plug 170 within valve body 162 due to wax thermostat 172. In such a manner, the mixing ratio of mixing valve 160 may be adjusted in with actuator assembly 180, as will be understood by those skilled in the art. A spring 178 may urge wax thermostat 172 towards stem 174 in order to regulate the position of wax thermostat 172 relative to stem 174.

Actuator assembly 180 may provide a convenient mechanism for adjusting or changing the mixing ratio of mixing valve 160. In particular, actuator assembly 180 permits a user of water heater appliance 100 to adjust or change the mixing ratio of mixing valve 160 without removing casing 102 or other components of casing 102. Further, by requiring the user to move knob 182 to the second position in order to couple linkage 188 to mixing valve 160, inadvertent adjustment of the mixing ratio of mixing valve 160 may be avoided or limited.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater appliance, comprising:
   a casing;
   a tank disposed within the casing, the tank defining an interior volume;

a sealed system operable to heat water within the interior volume of the tank, the sealed system comprising an evaporator and a compressor positioned within the casing at a top portion of the casing above the tank, a condenser of the sealed system mounted to the tank;

a cold water conduit mounted to the tank adjacent the top portion of the casing and configured for directing water into the interior volume of the tank;

a heated water conduit mounted to the tank adjacent the top portion of the casing and configured for directing water out of the interior volume of the tank;

a bypass conduit positioned within the casing at the top portion of the casing and extending from the cold water conduit;

a mixing valve positioned within the casing, the mixing valve fluidly coupled to the heated water conduit and the bypass conduit, a valve body of the mixing valve mounted to the heated water conduit and the bypass conduit, a plug of the mixing valve positioned with the valve body, a wax thermostat of the mixing valve positioned with the valve body and coupled to the plug, the wax thermostat configured for moving the plug within the valve body in order to adjust a mixing ratio of the mixing valve, a stem of the mixing valve threaded to the valve body, the stem extending through the valve body to the wax thermostat; and an actuator assembly comprising
 a knob positioned at an outer surface of the casing, the knob rotatable about an axis of rotation, the knob also movable along the axis of rotation between a first position and a second position;
 a linkage coupling the knob and the mixing valve together when the knob is in the second position on the axis of rotation; and
 a biasing mechanism configured for urging the knob towards the first position, the biasing mechanism of the actuator assembly comprising a spring,
 wherein the mixing valve is not adjustable with the knob when the knob is in the first position on the axis of rotation,
 wherein the linkage and the stem each define a plurality of splines, the plurality of splines of the linkage meshing with the plurality of splines of the stem when the knob is in the second position.

2. The water heater appliance of claim 1, wherein the spring of the actuator assembly is positioned within a shroud of the linkage and is compressed between the stem of the mixing valve and the linkage.

3. The water heater appliance of claim 1, wherein the heated water conduit and the bypass conduit are threaded onto the valve body.

4. The water heater appliance of claim 1, wherein the actuator assembly further comprises a shroud interface mounted to the casing at the outer surface of the casing, the knob disposed within the shroud interface.

5. The water heater appliance of claim 1, wherein the bypass conduit is a hose.

6. A water heater appliance, comprising:
a casing;
a tank disposed within the casing, the tank defining an interior volume;

a sealed system operable to heat water within the interior volume of the tank, the sealed system comprising an evaporator and a compressor positioned within the casing at a top portion of the casing above the tank, a condenser of the sealed system mounted to the tank;

a cold water conduit mounted to the tank adjacent the top portion of the casing and configured for directing water into the interior volume of the tank;

a heated water conduit mounted to the tank adjacent the top portion of the casing and configured for directing water out of the interior volume of the tank;

a bypass conduit positioned within the casing at the top portion of the casing and coupled to the cold water conduit;

a mixing valve positioned within the casing, the mixing valve fluidly coupled to the heated water conduit and the bypass conduit, a valve body of the mixing valve mounted to the heated water conduit and the bypass conduit, a plug of the mixing valve positioned with the valve body, a wax thermostat of the mixing valve positioned with the valve body and coupled to the plug, the wax thermostat configured for moving the plug within the valve body in order to adjust a mixing ratio of the mixing valve, a stem of the mixing valve threaded to the valve body, the stem extending through the valve body to the wax thermostat; and an actuator assembly defining an axial direction and comprising
 a knob positioned at an outer surface of the casing;
 a linkage extending along the axial direction from the knob towards the mixing valve; and
 a biasing mechanism coupled to the linkage and urging the linkage away from the mixing valve along the axial direction, the biasing mechanism of the actuator assembly comprising a spring,
 wherein the mixing valve is not adjustable with the knob when the knob is in the first position on the axis of rotation,
 wherein the linkage and the stem each define a plurality of splines, the plurality of splines of the linkage meshing with the plurality of splines of the stem when the knob is pushed towards the mixing valve along the axial direction.

7. The water heater appliance of claim 6, wherein the spring of the actuator assembly is positioned within a shroud of the linkage and is compressed between the stem of the mixing valve and the linkage.

8. The water heater appliance of claim 6, wherein the heated water conduit and the bypass conduit are threaded onto the valve body.

9. The water heater appliance of claim 6, wherein the actuator assembly further comprises a shroud interface mounted to the casing at the outer surface of the casing, the knob disposed within the shroud interface.

10. The water heater appliance of claim 6, wherein the bypass conduit is a hose.

* * * * *